United States Patent Office 2,979,534
Patented Apr. 11, 1961

2,979,534
NOVEL PROCESS FOR PREPARING SUBSTITUTED DIHYDRIC INDANE DERIVATIVES

John C. Petropoulos, Norwalk, and Frank A. V. Sullivan, Glenbrook, Conn., assignors to American Cyanamid Company, New York, N.Y., a corporation of Maine No Drawing. Filed Apr. 15, 1957, Ser. No. 652,656

8 Claims. (Cl. 260—619)

This invention relates to a method for the production of 1-(hydroxyphenyl)-indanols. More particularly, it relates to the dimerizaiton of alkenylphenols wherein the double bond of the latter is positioned adjacent to the carbon atom attached to the phenol nucleus. Still more specifically, it is concerned with the simultaneous dimerization of such latter alkenylphenols to form 1-(hydroxyphenyl)-indanols, prepared by cracking alkylidenebisphenols in the presence of a suitable condensing agent.

Hydroxyphenyl indanols have recently been shown to be important raw materials for the prdouction of epoxide resins that are useful in surface coatings. In United States Letters Patent No. 2,754,285, issued on July 10, 1956, to J. C. Petropoulos, one of the joint inventors herein, indanols of this class are prepared by dimerizing a styrene, sulfonating the thus-formed sulfonated product, separating and recovering the latter, and then heating to elevated temperatures to form a dihydric phenol. Unfortunately, this procedure is involved since it requires a number of steps that admit of careful processing and control. Accordingly, this constitutes a vexing problem. In view of the importance attributed to such hydroxyphenyl indanols, time and effort have been expended to provide a more direct and straightforward synthesis.

It is, therefore, a principal object of the present invention to overcome the disadvantages of the prior are by providing an improved method for the production of 1-(hydroxyphenyl)-indanols. Other objects will become apparent as the description proceeds.

It has been found according to the process of the invention that 1-(hydroxyphenyl)-indanols can be directly obtained in good yield by dimerizing alkenylphenols, wherein the alkenyl double bond is positioned adjacent to a carbon atom attached to the phenol nucleus. Unexpectedly, infusible and unreactive polymers are not obtained when such alkenylphenols are dimerized.

Alkenylphenols suitable for use in the process of the present invention may be described by the formula:

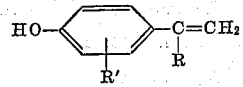

in which R represents methyl or ethyl and R′ represents hydrogen or alkyl or 1–4 carbon atoms, such as methyl, ethyl, n-propyl or n-butyl. Typical compounds of this class are: the isopropenyl-2-phenols, including isopropenyl-2-phenol, isopropenyl-2-cresol, isopropenyl-2-xylenol, 4-(2-isopropenyl)-2-ethylphenol, 4-(2-isopropenyl)-2-n-butylphenol and butenylphenols, such as 4-(2-butenyl)-phenol and 3-(2-butenyl)-phenol.

Although the foregoing substiuted phenols are not to be taken as a limitation on the present process, they and similar alkenylphenols can be obtained by cracking the corresponding alkylidene-bisphenols which can be represented by the structure:

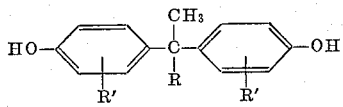

in which R and R′ have the meaning as above.

The alkylidenebisphenols which can be employed in the process of the invention are commercially available and are sold under such trade names as, for example, "Bisphenol A" and "Bisphenol C." The latter are prepared by reacting two mols of phenol or o-cresol with one mol of acetone to obtain 4,4′-isopropylidenebisphenol ("Bisphenol A") and 4,4′-isopropylidene bis-(o-cresol) sold as "Bisphenol C." Substituting other alkylphenols for the previously mentioned phenols and methyl ethyl ketone for acetone in such reaction, alkylidenebisphenols corresponding to the structure set forth above can be prepared.

By cracking such bisphenols is meant forming by heating both a phenol molecule and an alkenylphenol molecule according to the following equation:

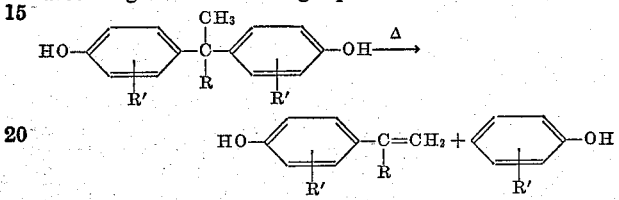

wherein R and R′ represent the radicals defined above. The phenol molecule can be separated from the alkenylphenol by known methods, as for instance distillation whereby due to the differences in boiling point, the phenol molecule may be vaporized and collected while recovering alkenylphenol as residual distilland. Heating of the bisphenol is usually carried out at temperatures between about 130° C. and 160° C. and preferably under reduced pressures.

In accordance with the process of the present invention, such alkenylphenols however produced are dimerized to the corresponding indanols. The reaction can be represented by the equation:

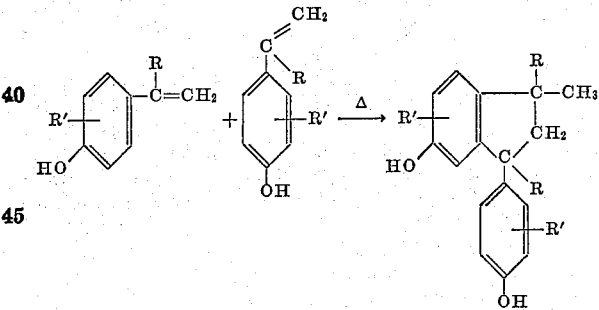

in which R and R′ have the same meaning as defined above.

Reaction is obtained by heating the alkenylphenol in the presence of suitable inert condensing agents. The latter includes: aromatic sulfonic acids as benzenesulfonic acid, paratoluenesulfonic acid, naphthalene sulfonic acid, and mineral acids, such as sulfuric acid and the like.

Reaction proceeds rapidly in the presence of small amounts, usually about .5% to about 20% by weight of the acidic condensing agent.

Dimerization may be carried out by directly heating the appropiate alkenylphenol to suitable reaction temperatures, preferably within the range of from about 110° C. to 160° C. Alternatively, it may be carried out under reflux in a hydrocarbon solvent, such as solvent naphtha. The product is preferably washed with an aqueous sodium carbonate solution to remove the acidic condensing agent and resultant product may be further purified by recrystallization, if desired.

It is a particular advantage of the present process, however, that dimerization can be carried out simultaneously while cracking an alkylidenebisphenol to the corresponding alkenylphenol. This is accomplished by providing a small amount, usually about .5% to 20%, of an acidic condensing agent during cracking. The procedure, therefore, constitutes a preferred method of practicing the process of our invention since it produces the desired 1-(hydroxyphenyl)-indanols from alkylidenebisphenols in a single operation which avoids the necessity of isolating alkenylphenols from the cracking reaction.

In general, when the conversion from alkylidenebisphenols to the corresponding hydroxyphenyl indanols is affected in a single operation, it is preferred to carry out the process under a reduced pressure, about 0.5 to 50 mm. of mercury. This facilitates removal by vaporization of the low boiling phenol liberated during cracking.

The desired 1-(hydroxyphenyl)-indanol product remains in the reaction vessel as a residue and can easily be purified from unreacted bisphenols, other phenolic impurities and acid condensing agent by washing with an aqueous solution of an alkali, such as a dilute sodium carbonate solution to solubilize the condensing agent and recrystallizing the product from a suitable solvent such as benzene, cyclohexane and mixtures of the same.

The invention will be further described and illustrated in the following specific example. It should be understood, however, that although the example describes certain specific features of the invention, it is given primarily for purposes of illustration and is not to be taken as limitative. Unless otherwise stated, the parts given are by weight.

*Example*

A mixture of 15 parts of Bisphenol "A" (4,4'-isopropylidenebisphenol) and 1.5 parts of paratoluenesulfonic acid monohydrate is charged to a small distilling flask. The flask is affixed to a still suitably adapted for vacuum distillation. The still is evacuated to a pressure of 1 mm. of mercury. The mixture in the flask is heated to 145° C. Heating is continued at this temperature until product no longer distills over. Condensed phenol distillate corresponding to about 93% of theory is thus collected. Residue remaining in the distilling flask is washed with water, dried and weighed. A yield of 7.8 parts of residue having a melting point of 160° C.–162° C. (uncorrected) amounting to 88% of theory is obtained. The latter is recrystallized from a 50–50 mixture of benzene and cyclohexane. Resultant crystals melt at 165° C.–166° C. (uncorrected). Infra-red analysis indicates the structure of the recovered crystals to be 1-(4-hydroxyphenyl)-1,3,3-trimethylindanol-6. In addition, the determined molecular weight (273) agrees fairly well with the theoretical molecular weight (268).

Although the 2-(4-hydroxyphenyl)-propene compound formed in situ has been illustrated above, equivalent α,β-unsaturated propene or butene compounds may also be dimerized by the process of the present invention. Other compounds particularly suitable for dimerization include for example: 2-(4-hydroxy-3-methylphenyl)-propene and 2-(4-hydroxyphenyl)-butene.

We claim:
1. A method of producing a 1-(hydroxyphenyl)-indanol which comprises simultaneously cracking and dimerizing in the presence of an acidic condensing agent and at temperatures of from about 130° C. to 160° C. an alkylidenebisphenol represented by the structure:

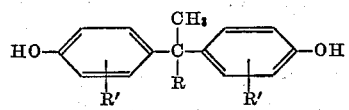

in which R is a radical selected from the group consisting of methyl and ethyl and R' is a radical selected from the group consisting of hydrogen and alkyl of from 1 to 4 carbon atoms, and recovering resultant 1-(hydroxyphenyl)-indanol.

2. A method of producing 1-(hydroxyphenyl)-indanol which comprises heating at cracking temperatures between about 130° C. and 160° C. in the presence of an aromatic sulfonic acid condensing agent an alkylidenebisphenol represented by the structure:

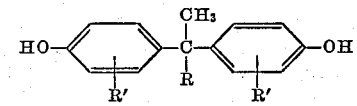

in which R is a radical selected from the group consisting of methyl and ethyl and R' is a radical selected from the group consisting of hydrogen and alkyl of from 1 to 4 carbon atoms, and recovering a 1-(hydroxyphenyl)-indanol.

3. The method according to claim 2 in which the aromatic sulfonic acid is p-toluenesulfonic acid.

4. The method according to claim 2 in which reduced pressure is employed.

5. A method of producing 1-(4-hydroxyphenyl)-1,3,3-trimethylindanol-6 which comprises heating a mixture of 4,4'-isopropylidenebisphenol and a small amount of an monocyclic carbocyclic aromatic sulfonic acid at temperatures between about 130° C. and 160° C., and recovering a 1-(4-hydroxyphenyl)-1,3,3-trimethylindanol-6.

6. The method according to claim 5 in which the aromatic sulfonic acid is p-toluenesulfonic acid.

7. The method according to claim 5 in which the reaction is carried out in the presence of an inert solvent.

8. The method according to claim 5 in which the solvent is naphtha.

References Cited in the file of this patent
UNITED STATES PATENTS

| | | |
|---|---|---|
| 1,782,966 | Jordan | Nov. 25, 1930 |
| 2,249,987 | Stanley et al. | July 22, 1941 |
| 2,497,503 | Jones | Feb. 14, 1950 |

OTHER REFERENCES

Baker et al.: Chem. Soc. Jour. (1940), 1094–98 (5 pages).